2,813,848

COPOLYMERS OF 1-CHLORO-2,2-DIFLUORO ETHYLENE AND 2,2,2-TRIFLUOROETHYL VINYL ETHER

John T. Barr, Neshaminy, Pa., assignor to Pennsalt Chemicals Corporation, a corporation of Pennsylvania No Drawing. Application September 28, 1955, Serial No. 537,292

7 Claims. (Cl. 260—87.5)

This invention relates to new polymeric materials and more particularly to copolymers of 1-chloro-2,2-difluoroethylene and to processes of preparing the same.

1-chloro-2,2-difluoroethylene, also called difluorovinyl chloride, has long been investigated as a potentially polymerizable material.

However, although it is structurally similar to other vinyl monomers, the difficulty encountered in its polymerization has set it apart from such monomers as vinyl chloride, vinyl fluoride, vinyl acetate, acrylonitrile, etc. Thus, polymerization processes generally applied to most vinyl type monomers, when applied to difluorovinyl chloride, yield only traces of homopolymeric substances of very low molecular weight.

Attempts by the present applicant over a long period of time to copolymerize difluorovinyl chloride with other common monomers such as vinyl chloride, acrylonitrile, and styrene have been unsuccessful. Not only did copolymerization not take place, but in some instances the presence of difluorovinyl chloride inhibited homopolymerization of the comonomer being used.

It has now been found that although difluorovinyl chloride will not copolymerize with most of the other vinyl type monomers, it will readily copolymerize with 2,2,2-trifluoroethyl vinyl ether to form useful polymeric substances.

Another important and valuable feature of this copolymerization is the desirable effect it has on the physical properties of the polymer of 2,2,2-trifluoroethyl vinyl ether. For example, the homopolymer of 2,2,2-trifluoroethyl vinyl ether, which does not form readily, has been found to be a sticky, rubbery mass. On the other hand, the copolymerization of 2,2,2-trifluoroethyl vinyl ether with difluorovinyl chloride readily results in copolymers with useful properties which by variation of the polymerization conditions of this invention can be made to range from soft to hard thermoplastic solids.

In practicing the process of this invention difluorovinyl chloride and 2,2,2-trifluoroethyl vinyl ether are mixed and subjected to polymerization conditions. Emulsion polymerization conditions are preferred but other known polymerization techniques such as mass or solution polymerization may also be used. In a preferred embodiment of my invention the two monomers are mixed with water, an emulsifying agent and a catalyst or free-radical polymerization initiator and the mixture agitated. The degree and rate of polymerization may advantageously be controlled by varying the amount of catalyst used and the temperature.

The proportions of difluorovinyl chloride and 2,2,2-trifluoroethyl vinyl ether monomers used are generally in a 1:1 ratio, but may be varied within the scope of the invention, depending on the properties desired in the copolymer. Since a molecule of difluorovinyl chloride does not readily attach itself to another molecule of difluorovinyl chloride, and since the same is true for the 2,2,2-trifluoroethyl vinyl ether, the proportion of each monomer in preferred operation is usually in the neighborhood of 50 mol percent. However, as little as 20 mol percent of difluorovinyl chloride monomer may be used advantageously with up to 80 mol percent of 2,2,2-trifluoroethyl vinyl ether in practicing my invention.

The copolymerization reaction according to my invention may be carried out at temperatures of from below 0° C. to the critical temperature of difluorovinyl chloride, which is about 122° C. The preferred reaction temperature is from 5° to 60° C.

The amount of water used in carrying out an emulsion polymerization is not critical but for practical purposes it is preferred to use an amount of from 1 to 2 times the combined weights of the monomers. A sodium salt of an alkyl aryl polyether sulfonate, known under the trade name of Triton X-200, and an alkyl aryl polyether alcohol, known under the trade name of Triton X-100, have been used as emulsifying agents in this polymerization although other conventional emulsifying agents may also be used. The amount of emulsifying agent may be varied from about 0.1% to about 15% of the combined weight of the monomers, although the preferred amount is from 1% to 10%.

A number of materials are known to the art as emulsion polymerization catalysts or free-radical polymerization initiators and almost any of these may be used. A few examples of such materials are peroxy compounds including oxygen, ozone, hydrogen peroxide, benzoyl peroxide, cumene hydroperoxide and other organic peroxides, organic ozonides, percarbonates, perborates, perchlorates, and persulfates. The preferred catalysts in the practice of my invention are the persulfates of ammonium, sodium and potassium. The speed of the polymerization reaction is partially dependent on the amount of catalyst used, and in operating the process of my invention with potassium persulfate as catalyst, the amount may be varied from about 0.1% to about 2% of the combined monomer weights, although the preferred amount is 0.5%.

Although the objects of my invention are to make available new copolymers of difluorovinyl chloride and 2,2,2-trifluoroethyl vinyl ether and processes for preparing these copolymers, it is to be understood also that in some cases the products of my invention may contain homopolymers of 2,2,2-trifluoroethyl vinyl ether in addition to the said copolymers. This is particularly true when the copolymerization is carried out using a smaller proportion of difluorovinyl chloride monomer.

In general the copolymers of difluorovinyl chloride and 2,2,2-trifluoroethyl vinyl ether which have the most valuable properties are thermoplastic solids, although valuable products ranging from rubbery to hard solids at ordinary temperatures may also be prepared, depending on the application desired, by varying the ratio of the monomers used and the conditions and degree of polymerization. Polymeric products prepared according to my invention may contain from 20 to 80 mol percent combined difluorovinyl chloride and from 80 to 20 mol percent combined 2,2,2-trifluoroethyl vinyl ether, but preferred products contain 50 mol percent combined difluorovinyl chloride and 50 mol percent combined 2,2,2-trifluoroethyl vinyl ether.

The new polymeric products of this invention have been found to have several commercially valuable properties. For example, unplasticized copolymers were found very useful as the film-forming ingredient in corrosion resisting paints and finishes. A strong, adhesive, water and corrosion resistant film was formed on metal by painting on a solution of the copolymer dissolved in a mixture of lower aliphatic ketones and esters of the type usually used in lacquers. From the polymer of Example I, for example, clear flexible sheets of moderate mechanical strength and elasticity were formed by molding copolymers plasticized and milled with 15% by weight of dioctyl phthlate. The copolymer of Example II, when plasticized with 12% by weight of a liquid polychlorotrifluoroethylene oil and formed into a clear flexible sheet, was found to have outstanding resistance to concentrated nitric acid.

Examples of especially valuable applications include gaskets, packings, flexible piping and hose linings, coatings, chemically resistant gloves and boots, etc.

From the foregoing disclosure it is clear that the new polymeric products of this invention possess important characteristics not possessed by polymers heretofore available, and can be used to advantage in a large number of commercial products.

The invention and its practice are further illustrated by the following examples, in which the parts are by weight:

Example I

A pressure reactor was charged with 50 parts of difluorovinyl chloride, 50 parts of 2,2,2-trifluoroethyl vinyl ether, 150 parts of water, 3 parts of Triton X–200, and 0.5 part of potassium persulfate and closed. The reactor was then agitated at 50° C. for 42 hours. 82.5 parts of a white, powdery polymer soluble in oxygen-containing solvents such as methylethyl ketone were obtained. This polymer was milled with 15% by weight of dioctyl phthalate, then molded at 70° C. and 500 p. s. i. g. for 15 minutes to give a clear flexible sheet with tensile strength of 580 pounds at 210% elongation and a Shore "A" hardness of 94.

Example II

A pressure reactor was charged with 25 parts of difluorovinyl chloride, 75 parts of 2,2,2-trifluoroethyl vinyl ether, 150 parts of water, 3 parts of Triton X–200 and 0.5 part of potassium persulfate and closed. The reactor was then agitated at 40° C. for 42 hours. 57.5 parts of a white, powdery, solid polymer soluble in oxygen-containing solvents such as methylethyl ketone were obtained. This polymer was plasticized with 12% by weight of a liquid polychlorotrifluoroethylene oil and formed a clear flexible sheet with outstanding resistance to concentrated nitric acid. A sample of the polymer was placed in 70% nitric acid and heated at 100° C. for 18 hours without adversely affecting the physical properties of the sheeted material.

Example III

To demonstrate the unique character of the above discussed copolymerization, a pressure reactor was charged with 100 parts of difluorovinyl chloride, 150 parts of water, 3 parts of Triton X–200, and 0.5 part of potassium persulfate and closed. The reactor was then agitated at 50° C. for 47 hours. On opening the reactor at the end of this reaction period all of the difluorovinyl chloride was recovered unreacted. No polymer was obtained.

Example IV

To further illustrate the unique character of my invention a pressure reactor was charged with 50 parts of difluorovinyl chloride, 50 parts of vinyl chloride, 150 parts of water, 3 parts of Triton X–200 and 0.5 part of potassium persulfate and closed. The reactor was then agitated at 50° C. for 47 hours. 30 parts of polyvinyl chloride polymer, containing no fluorine, were obtained.

As many widely different embodiments of this invention may be made without departing from the scope and spirit of it, it is to be understood that my invention includes all such embodiments and is not to be limited by the above description.

I claim:

1. A new composition of matter comprising a copolymer of 1-chloro-2,2-difluoroethylene and 2,2,2-trifluoroethyl vinyl ether containing from 20 mol percent to 80 mol percent combined 1-chloro-2,2-difluoroethylene and from 80 mol percent to 20 mol percent combined 2,2,2-trifluoroethyl vinyl ether.

2. A new composition of matter comprising a copolymer of 1-chloro-2,2-difluoroethylene and 2,2,2-trifluoroethyl vinyl ether containing 50 mol percent combined 1-chloro-2,2-difluoroethylene and 50 mol percent combined 2,2,2-trifluoroethyl vinyl ether.

3. A process for preparing a new polymeric product which comprises heating to polymerization temperature a mixture containing from 20 to 80 mol percent of 1-chloro-2,2-difluoroethylene and from 80 to 20 mol percent of 2,2,2-trifluoroethyl vinyl ether in contact with a free-radical polymerization initiator.

4. A process for preparing a new polymeric product which comprises heating to polymerization temperature an emulsified mixture containing from 20 to 80 mol percent of 1-chloro-2,2-difluoroethylene and from 80 to 20 mol percent of 2,2,2-trifluoroethyl vinyl ether in contact with a free-radical polymerization initiator.

5. The process of claim 4 in which the polymerization temperature is in the range from 0° to about 122° C.

6. A process for preparing a new polymeric product which comprises heating in the temperature range from 0° to about 122° C. a mixture containing from about 20 to about 79 parts by weight of 1-chloro-2,2-difluoroethylene and from about 25 to about 101 parts of 2,2,2-trifluoroethyl vinyl ether in contact with 0.1 to about 0.25 part of a free-radical polymerization initiator, about 115 to about 240 parts of water, and about 0.1 to about 18 parts of emulsifying agent.

7. The process of claim 4 in which the free-radical polymerization initiator is an inorganic peroxy compound selected from the group consisting of ammonium persulfate, sodium persulfate and potassium persulfate.

References Cited in the file of this patent

UNITED STATES PATENTS

| | | |
|---|---|---|
| 2,479,367 | Joyce et al. | Aug. 16, 1949 |
| 2,631,975 | Lawson | Mar. 17, 1953 |